BISTABLE SEMICONDUCTOR DEVICES

Filed July 29, 1954

Inventors:
Winfield W. Tyler;
Roger Newman,
by Paul A. Frank
Their Attorney.

2,871,377

BISTABLE SEMICONDUCTOR DEVICES

Winfield W. Tyler, Scotia, and Roger Newman, Schenectady, N. Y., assignors to General Electric Company, a corporation of New York Application July 29, 1954, Serial No. 446,509

6 Claims. (Cl. 307—88.5)

This invention relates to semiconductor electric current controlling devices.

An object of the present invention is to provide a semiconductor current control device which may exhibit two possible alternative values of resistance within a given range of operating voltages.

Another object of the invention is to provide a semiconductor current control device which may be changed from a first stable operating condition to a second stable operating condition in response to pulsed signals.

Still another object of the invention is to provide germanium current controlling devices, the resistance of which may be made to vary between two widely divergent values by the application of pulsed radiant energy or voltage signals.

In general, semiconductor controlling devices in accord with the invention are provided in the form of semiconductor bodies having high resistivities and deep-lying induced energy levels therein with a rectifying or injector contact to one surface portion thereof and a non-rectifying contact to another surface portion thereof, and means for applying pulsed signals thereto. Under the appropriate conditions, such semiconductor devices may be caused to change from a first stable forward resistivity value to a second stable forward resistivity value when subjected to a pulse of voltage or light. Devices constructed in accord with this invention may be used as switching devices, relay devices, voltage regulators, overvoltage detecting devices, light detecting devices and temperature sensitive devices.

The novel features believed characteristic of the invention are set forth in the appended claims. The invention itself, however, together with further objects and advantages thereof may best be understood by reference to the following description taken in connection with the accompanying drawing, in which:

Figures 1, 2, 3A, 3B:
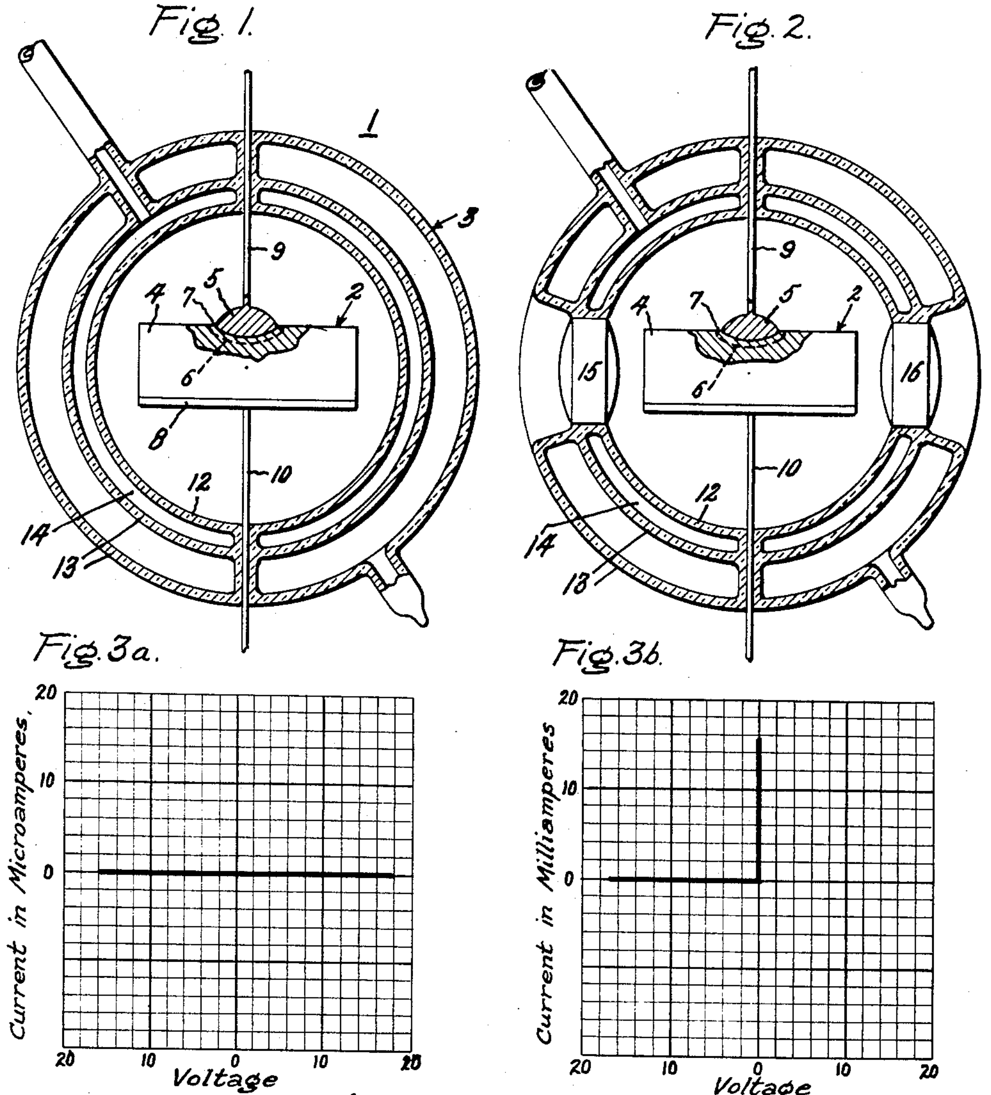
Fig. 1 illustrates a bistable semiconductor device constructed in accord with the invention.
Fig. 2 shows a modification of the device of Fig. 1.
Figure 4:
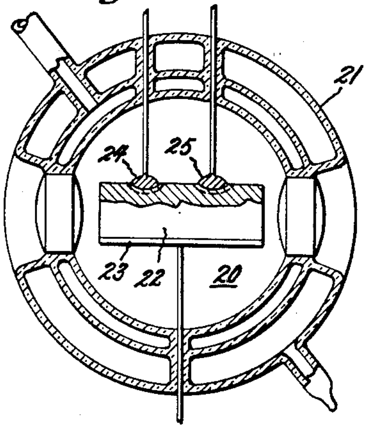

Figs. 3*a* and 3*b* are oscilloscope patterns depicting the electrical characteristics of a device constructed in accord with the invention; and Fig. 4 shows an alternative embodiment of the invention.

Semiconductors such as germanium and silicon have been conventionally classified as either positive (P-type) or negative (N-type), depending primarily upon the type and sign of their predominant conduction carriers. Whether a particular semiconductor body exhibits N-type or P-type characteristics depends primarily upon the type of significant impurity elements or activators present in the semiconductor. Some such activator elements, called donors, function to furnish additional electrons to the semiconductors so as to produce an N-type semiconductor with an electronic excess, while others, called acceptors, function to take electrons from the semiconductor valence band to create P-type semiconductors with an excess of positive conduction carriers or holes. P–N junction semiconductor units have a zone of P-type semiconductor adjoining a zone of N-type semiconductor to form an internal space charge barrier having a relatively large or broad area, as distinguished from the point contact type of semiconductor device.

Such a P–N junction within a semiconductor body possesses marked rectifying characteristics. Thus, if an electric potential is applied to the semiconductor so that the positive polarity is connected to the N-type or excess electron containing zone adjacent the P–N junction and the negative polarity is connected to the P-type zone, the P–N junction space charge barrier will act as a high impedance to current flow. This direction of applied polarity is known as the reverse or difficult direction of current flow. If, on the other hand, a voltage is connected to the P–N junction in the opposite manner, so that the positive polarity is connected to the P-type zone and the negative polarity to the N-type zone, an appreciable conduction current is observed. This direction of applied polarity is known as the forward or easy flow direction. If an alternating voltage is connected across a P–N junction unit, the unit will be biased in the forward or easy flow direction half of the time and in the difficult flow direction the other half. Thus, unidirectional current will flow for one half of the ordinary sine wave cycle and no appreciable current will flow for the other half. In this manner, a P–N junction transforms alternating current to direct current and rectification occurs.

The above fundamental description of the rectifying effects of a P–N junction semiconductor device is generally directed to the case in which impurity activator elements from groups III or V of the periodic chart are added to the semiconductor device in order to provide an excess of electronic or positive hole conductors. P–N junction semiconductor bodies of, for instance, germanium and silicon, when impregnated with group III and group V activator elements, may provide very low resistivities in the forward direction. These resistivities may be as low as 1 ohm centimeter or less. It has recently been discovered that, when semiconductor bodies such as germanium and silicon are impregnated with elements other than the conventional group III and group V activator elements, extremely high resistivities may be obtained, particularly at low temperatures. These high resistivities are generally believed to be the result of deep-lying impurity activated energy levels within the semiconductor crystal lattice system. Some impurities which are known to induce deep-lying energy levels in semiconductor crystal lattice structures are iron, zinc, cobalt, gold and copper. Deep-lying energy levels may be induced in a semiconductor body by means other than impurity impregnation. Some other methods for inducing deep-lying energy levels are bombardment by high energy particles, and by plastic deformation.

We have discovered that, when a P–N junction semiconductor device includes a semiconductor body having deep-lying energy levels within the forbidden band of the semiconductor crystal lattice, a bistable breakdown device may be produced. Such breakdown devices are characterized by the existence, for any given applied electrical potential within a given range, of two stable values of forward resistivity. In general, for voltages below that which may be termed the breakdown potential, devices constructed in accord with this invention show a very high resistivity in the forward direction. When, however, the breakdown potential has been exceeded, a mechanism, which has been identified as injection breakdown, takes place and the forward resistivity of the semiconductor body containing the P–N junction falls to a stable relatively low value.

The process of injection breakdown is believed to be due to the cumulative effect of the trapping of minority conduction carriers which are injected at the P–N junction barrier. What constitutes minority conduction carriers depends upon the conduction characteristics of the semiconductor body. In an N-type semiconductor body positive holes are minority carriers. In a P-type semiconductor body electrons are minority carriers. These minority carriers are believed to be trapped at deep-lying induced energy levels, and cause majority conduction carriers to be drawn from the low resistance contact to maintain electrical neutrality. The added majority carriers decrease the resistivity of the semiconductor body, first in the region of the barrier, localizing the electric field, and causing the further injection of added minority carriers. This process continues until a low resistance path extends across the entire body and an appreciable flow of current takes place. Injection breakdown occurs only when voltage is applied in the forward direction, at which time minority carriers may be injected. Injection breakdown is not due to heating of the semiconductor lattice but is an electronic process. There is no destructive localized heating as in the case of dielectric breakdown in insulators.

When the devices of this invention are connected to an alternating potential, current flows only during breakdown, and then only in the forward direction. Under ordinary operating voltages the barrier does not break down in the reverse direction, thus the reverse current remains low, even after injection breakdown. Once a breakdown condition has been established within the semiconductor body, the applied potential may be lowered to a very small fraction of the breakdown voltage and the device will remain in a stable low forward resistance state as long as the breakdown is continued. In other words, the voltage necessary to keep the device in a stable, low forward resistance state is much lower than the voltage necessary to initiate breakdown.

When such a bistable semiconductor device is connected in an electric circuit and a potential applied thereto, substantially no current flows as long as injection breakdown has not occurred. When, however, the applied voltage has risen to such a value that injection breakdown may occur, a very large amount of current flows within the circuit and forward current is, in many instances, limited primarily by the resistance of the external circuit. Thus, a device constructed in accord with this invention may be triggered from a non-conducting to a conducting state by a short voltage pulse sufficiently high as to exceed the breakdown potential. Similarly, once breakdown has occurred, even though the sustaining voltage is reduced below that which is necessary to cause initial breakdown, the semiconductor device remains in a conducting condition until the applied voltage has been reduced below the minimum sustaining voltage for a time sufficient to allow for recombination of minority carriers, and the consequent return of the semiconductor to a high resistivity, non-conducting, stable condition. This time depends on the depth of the trapping states which determines the effective lifetime of injected minority carriers.

A further feature of the invention is dependent upon the fact that the injection berakdown described hereinbefore may be initiated by a pulse of radiant energy as, for instance, visible light, when the voltage applied to the devices of the invention are maintained below the breakdown potential. Additionally, once the bistable devices of the invention have become conducting, and the voltage applied thereto has been reduced to a value near the minimum sustaining voltage, the devices may be made non-conducting by an incident pulse of infrared light of appropriate wavelength.

In general, the semiconductor material from which the devices of this invention are constructed should satisfy the following criteria. The semiconductor body should have induced therein deep-lying energy levels within the forbidden band. These induced energy levels should be capable of trapping injected minority carriers. The semiconductor body should possess high resistivity under normal operating conditions before injection breakdown. There should be a rectifying P–N junction barrier within the semiconductor body to serve as a source of injected minority carriers. There should also be a non-rectifying contact to the semiconductor body to serve as a source of majority carriers.

In Fig. 1 a bistable semiconductor diode device constructed in accordance with the invention is generally represented as 1, and comprises a semiconductor diode 2 within a temperature controlled vessel 3. Diode 2 comprises a semiconductor body 4 which may be a thin crystalline wafer, preferably monocrystalline in structure, having length and width dimensions much greater than its thickness, a rectifying contact 5 which is fused to and diffused within one major face of semiconductor wafer 4 forming a P–N junction 6 within surface adjacent region 7, and a non-rectifying low resistance contact 8, connected to the opposite major face of semiconductor wafer 4. Semiconductor wafer 4 should satisfy the above-discussed criteria of high resistivity and induced energy levels which may trap minority carriers. One convenient means for satisfying these criteria is by impurity impregnation. Thus, semiconductor wafer 4 may be cut from a semiconductor crystal as, for example, germanium, which has been impregnated with a trace of iron, cobalt, gold, zinc or copper.

While the above-described desired properties may be found in other impurity impregnated semiconductor bodies, they are quite pronounced, and have been extensively studied, in iron impregnated germanium. The preparation of iron impregnated germanium crystals is described and claimed in our copending application, Serial No. 426,098, filed April 28, 1954, and assigned to the same assignee as the present invention.

Rectifying contact 5 of semiconductor device 1 should be an impurity element for supplying conductivity type carriers opposite to the conductivity type of the body of semiconductor wafer 4. Thus, if semiconductor wafer 4 is P-type, contact 5 may comprise an alloy of tin and arsenic, antimony, or phosphorus; or an alloy of indium with approximately 10% of any of the donor activator elements, antimony, arsenic, or phosphorus, as disclosed and claimed in the application of John S. Saby, Serial No. 410,609, filed February 16, 1954, and assigned to the same assignee as the present invention. If, on the other hand, wafer 4 is N-type, rectifying contact 5 may comprise any acceptor activator element or alloy, as for example, indium, gallium and aluminum, or alloys thereof. Contact 8 may be any metal which makes a non-rectifying contact with semiconductor wafer 4. If semiconductor wafer 4 is N-type, contact 8 may conveniently be tin, or an alloy of tin and arsenic or tin and antimony. If semiconductor wafer 4 is P-type contact 8 may conveniently be tin, indium or aluminum, or an alloy of tin with any acceptor activator element or combination thereof. Terminal leads 9 and 10 are connected to contacts 5 and 8 respectively by any suitable method, as for example, soldering, and serve to connect bistable device 2 to a source of pulsed voltage.

Thermal case 3 may conveniently comprise a double wall Dewar type flask with a single interior wall 12 and a double exterior wall 13 and an intermediate space 14 which may be filled with a thermal fluid for maintaining semiconductor device 2 at the proper temperature in order to secure bistable operation therefrom. The temperature at which bistable operation may be attained will vary somewhat with the composition of semiconductor wafer 4.

Fig. 2 of the drawing illustrates a modified form of the device of Fig. 1 which has been adapted to be triggered and quenched by incident pulses of radiant energy. Lens means 15 has been inserted in the wall of thermal vessel 3 to focus visible light from a source (not shown) for initiating injection breakdown in diode 2 to render it conducting. Second lens means 16 has been inserted in an opposite portion of the wall of thermal vessel 3 to focus infra-red light upon diode 2 to render it non-conducting.

Some electrical characteristics of a bistable semiconductor device as shown in Fig. 2 may now be specifically described. In the device the characteristics of which are described herein, semiconductor wafer 4 of semiconductor device 1 comprises a crystalline body of high purity germanium, preferably N-type, impregnated with a trace of iron as described in our aforementioned application Serial No. 426,098. According to the aforementioned application, a semi-conductor body comprising high purity germanium impregnated with a trace of iron may be produced by seed crystal withdrawal from a melt to which has been added a small proportion of iron. The term "high purity germanium" is used herein to mean germanium having less than $5 \times 10^{13}$ atoms of uncompensated activator impurities per cubic centimeter of germanium. The term "trace of iron" is used herein to mean from $10^{12}$ to $10^{14}$ atoms of iron per cubic centimeter of germanium.

The base germanium to which iron is added to form the material of semiconductor wafer 4 should be intrinsic and have a resistivity in excess of 40 ohm centimeters at 25° C. The conduction characteristics of a germanium body may be said to be intrinsic at a given temperature when the conduction carriers in the body comprises essentially equal numbers of electrons and positive holes. This high resistivity, room temperature intrinsic germanium may be achieved by purification to insure a minimum quantity of activator impurities, or may be obtained by balancing the presence of donor and acceptor activator impurities within the germanium so that the positive and negative electrical conduction carriers within the germanium body are present in substantially equal numbers and compensate each other electrically. Accordingly, before the addition of iron to the base germanium, there should be less than $5 \times 10^{13}$ or less atoms of uncompensated activator impurities per cubic centimeter of germanium. Since the segregation coefficient (which is the ratio of the amount of an impurity within a solidified germanium crystal to the amount of impurity in a liquid phase from which the solidified germanium is drawn) of iron in germanium is very low; of the order of $10^{-6}$ or less, only a very small amount of iron will be present in the solid germanium crystal. The amount of iron present in the solidified crystal will depend upon the concentration of iron in the melt, which may be readily controlled. With approximately from 0.05 to 0.10 atomic percent of iron in the melt, approximately $10^{12}$ to $10^{14}$ atoms of iron per cubic centimeter of germanium will enter the growing crystal. Even this small trace of iron, however, is sufficient.

The deep-lying energy levels induced by small traces of iron in high purity germanium cause the resultant germanium body to exhibit very high resistivities in the temperature range from −100° C. to −200° C. These high resistivities are of the order of $10^{10}$ ohm-centimeter or greater. When the device of Fig. 2 is maintained at this low temperature as, for instance, by filling thermal vessel 3 with liquid air or liquid nitrogen, bistable operation may be readily obtained over a useful range of low applied operating voltages. When semiconductor wafer 4 comprises high purity germanium impregnated with from $10^{12}$ to $10^{14}$ atoms of iron per cubic centimeter of germanium and having a low temperature resistivity of the order of from $10^{10}$ to $10^{12}$ ohm centimeter, bistable device 1 will retain this very high value of resistivity for voltage gradients within wafer 4 up to approximately 150 volts per centimeter without breaking down. As an example, one bistable device having a semiconductor wafer 4 approximately 0.33 cm. thick exhibited an initial injection breakdown potential of approximately 50 volts. Once the device has changed from a first, stable, high-resistivity value to a second, stable, low-resistivity value, it may be maintained in the second stable condition with only a fraction of the breakdown voltage. Thus, the same device used in the above example, while requiring a value of approximately 50 volts for breakdown, was maintained in a low-resistivity, conducting condition with an applied voltage of only 2 volts. It may be seen, therefore, that the device of this illustrative example possessed two stable resistivity values for values of applied voltage from 2 to 50 volts. These values are cited by way of example only and it is to be appreciated that they may be changed by changing the geometry of the device, the initial resistivity of germanium wafer 4 or the operating temperature of several of these cited parameters.

In Figs. 3*a* and 3*b* there are shown the electrical characteristics of a device constructed in accordance with the invention which allow bistable operation to be controllable by pulsed signals of radiant energy.

Figs. 3*a* and 3*b* are oscilloscope patterns which represent the voltage-current characteristics of a device of Fig. 2 wherein semiconductor wafer 4 comprises a crystalline body of high purity N-type germanium impregnated with a trace of iron, before and after injection breakdown. In Fig. 3*a* an alternating voltage having a peak value of 17 v. is applied to terminal leads 9 and 10 of bistable device 1. As the germanium wafer 4 of this device was approximately 0.33 cm. thick, this represents a field strength of approximately 50 volts per centimeter, well below the breakdown field strength. The region to the left of the zero voltage line represents a bias in the reverse or difficult flow direction of diode 2. The region to the right of the zero voltage line represents a bias in the forward or easy flow direction. With no visible light incident upon diode 2, and the applied voltage below breakdown potential, no appreciable current flows through diode 2. Fig. 3*b* represents the voltage-current characteristic of bistable device 1 after a 1/100 sec. pulse from a neon lamp has fallen through lens means 15 upon diode 2. The calibration of the current scale of Fig. 3*b* has been changed by a factor of 1,000 from that of Fig. 3*a* in order to keep the current on scale. After breakdown has occurred, no current flows in the reverse direction, but the current in the forward direction is limited primarily by the external resistance in the circuit, and the negligible resistivity of the low, stable value of approximately 10 to 100 ohm-centimeters for bistable device 1.

The device of Fig. 2 may be returned to the stable non-conducting, high resistivity condition as illustrated by the oscilloscope pattern of Fig. 3*a* by a pulse of infra-red light which may be directed upon wafer 4 through lens means 16 in thermal vessel 3.

The quantum energies of incident radiation which will initiate and quench breakdown in the bistable devices of this invention vary with the composition of the semiconductor material and the means by which low lying energy levels are induced. As an example, however, when the semi-conductor wafer 4 of bistable device 1 comprises N-type germanium impregnated with a trace of iron, as hereinbefore described, radiation having quantum energies in excess of about 0.7 electron volt, which may, for instance, be visible and near infra-red light of approximately 1.8 microns wave-length or shorter, will initiate breakdown when the applied voltage is above the minimum sustaining, but below the breakdown potential. Similarly, radiant energy having quantum energies from approximately 0.4 to 0.6 e. v. will quench breakdown when the applied potential is only slightly above the minimum sustaining voltage. Such radiation may, for example, be infra-red light of from approximately 2.0 to 3.0 microns wavelength.

The radiant energy necessary to initiate and quench breakdown in the bistable devices of the invention need not be large in magnitude. Additionally, as the applied voltage (in the case of breakdown) is raised to a value approaching the breakdown potential, the amount of incident energy necessary to cause breakdown decreases. As an example of this feature, a bistable diode device as illustrated in Fig. 1 in which wafer 4 comprised a body of high purity germanium impregnated with a trace of iron 0.5 cm. thick was tested. For this device the breakdown potential in the dark was 75 volts. With a potential of 3 volts applied to the device, breakdown was initiated upon the incidence of 1.5 micron wavelength light energy having a value of $10^{-5}$ watts. With the applied potential raised to 9 volts the value of the same wavelength light necessary to initiate breakdown fell to $10^{-6}$ watts. When the applied potential was raised to 45 volts, the breakdown light energy value fell to $10^{-7}$ watts.

In Fig. 4 there is shown a further feature of the invention. The device of Fig. 4 includes a three-terminal semiconductor device 20 enclosed within thermal vessel 21. Semiconductor device 20 includes a semiconductor wafer 22 having a non-rectifying contact 23 to one major face thereof, and two rectifying contacts 24 and 25 to the other major face thereof. The resistance between contacts 23, 24, and 25 is substantially infinite as long as a breakdown has not been initiated. When, however, injection breakdown has been initiated between rectifying contact 24 and non-rectifying contact 23, the device functions as a transistor, with contact 24 serving as an emitter, contact 25 as a collector and contact 23 as the base connection. The triode device 20 may be returned to a stable, non-conducting state by decreasing the emitter voltage to zero for a sufficient length in time.

Semiconductor wafer 22 may be formed in the same manner as wafer 4 of the device of Fig. 1, and may conveniently be a crystalline body of germanium having no more than $5\times10^{13}$ atoms of iron per cubic centimeter of germanium to which has been added from $10^{12}$ to $10^{14}$ atoms per cubic centimeter of iron. Rectifying contacts 24 and 25 of semi-conductor device 21 should be an impurity element for supplying conductivity type carriers opposite to the conductivity type of body of semiconductor wafer 22. Thus, if semiconductor wafer 22 is P-type, contacts 24 and 25 may comprise an alloy of tin and arsenic, antimony, or phosphorus; or an alloy of indium with approximately 10% of any of the donor activator elements, antimony, arsenic, or phosphorus. If, on the other hand, wafer 22 is N-type, rectifying contacts 24 and 25 may comprise any acceptor activator element or alloy, as for example, indium, gallium and aluminum or alloys thereof. Low resistance contact 23 may be any metal which makes a non-rectifying contact with semiconductor wafer 22. If semiconductor wafer 22 is N-type, contact 23 may conveniently be tin, or an alloy of tin and arsenic or tin and antimony. If semiconductor wafer 22 is P-type contact 23 may conveniently be tin, indium or aluminum, or an alloy of tin with any acceptor activator element or combination thereof.

While we have described above certain specific and alternative embodiments of our invention, many modifications can be made. It is to be understood, therefore, that we intend, by the appended claims, to include all such modifications as fall within the true spirit and scope of the invention.

What we claim as new and desire to secure by Letters Patent of the United States is:

1. A bistable asymmetrically conductive device comprising a homogeneous mono-crystalline semiconductor body having two possible stable forward resistivity values and consisting essentially of near intrinsic semiconductive material having a room temperature resistivity of at least 40 ohm-centimeters and having deep lying energy levels induced therein by impurity impregnation with a metallic element other than the metals of groups III and V of the periodic table, a P–N junction rectifying contact at one surface portion of said body, a non-rectifying contact to a second surface portion of said body, and means for applying a pulsed signal to said body to cause its resistivity to change abruptly from a first stable forward resistivity value to a second stable forward resistivity value.

2. A bistable asymmetrically conductive device comprising a homogeneous mono-crystalline semiconductor body having two possible stable forward resistivity values and consisting essentially of near intrinsic semiconductive material having a room temperature resistivity of at least 40 ohm-centimeters and having deep lying energy levels induced therein by impurity impregnation with a metallic element other than the metals of groups III and V of the periodic table, a P–N junction rectifying contact at one surface portion of said body, a non-rectifying contact to a second surface portion of said body, and means for maintaining said body at a predetermined fixed temperature, said body being adapted to shift from a first stable forward resistivity value to a second stable forward resistivity value when energized with a pulsed signal.

3. A bistable, asymmetrically conductive device including a homogeneous mono-crystalline body of semiconductive material having two possible stable forward resistivity values and comprising high purity germanium impregnated with a trace of a material selected from the group consisting of copper, gold, zinc, cobalt and iron, a P–N junction rectifying contact at one surface portion of said body, a non-rectifying contact to a second surface portion of said body, means for maintaining said body at a predetermined fixed temperature said body being adapted to shift from a first stable forward resistivity value to a second stable forward resistivity value when energized with a pulsed signal.

4. A bistable asymmetrically conductive device including a homogeneous crystalline body of semiconductive material having two possible forward resistivity values and comprising germanium with no more than $5\times10^{13}$ atoms of uncompensated activator impurities per cubic centimeter thereof, impregnated with from $10^{12}$ to $10^{14}$ atoms of iron per cubic centimeter of germanium, a rectifying contact to one surface portion of said body, a non-rectifying contact to a second surface portion of said body, and means for maintaining said body at a predetermined fixed temperature, said body being adapted to shift from a first stable forward resistivity value to a second stable forward resistivity value when energized with a pulsed signal.

5. A bistable asymmetrically conductive device including a homogeneous crystalline body of semiconductive material having two possible forward resistivity values and comprising germanium with no more than $5\times10^{13}$ atoms of uncompensated activator impurities per cubic centimeter thereof, impregnated with from $10^{12}$ to $10^{14}$ atoms of iron per cubic centimeter of germanium, a rectifying contact to one surface portion of said body, a non-rectifying contact to a second surface portion of said body, and means for maintaining said body at a temperature of from approximately −100° C. to −200° C., said body being adapted to shift from a first stable forward resistivity value to a second stable forward resistivity value when energized with a pulsed signal.

6. A bistable asymmetrically conductive device comprising a homogeneous mono-crystalline semiconductor body having two possible stable resistivity values, composed of high purity germanium impregnated with a trace of iron, a P–N junction rectifying contact at one surface portion of said body, and a non-rectifying contact to a second surface portion of said body, said body being adapted to shift from a first stable forward resistivity value to a second stable forward resistivity value when energized with a pulsed signal.

References Cited in the file of this patent

UNITED STATES PATENTS

| | | |
|---|---|---|
| 2,530,110 | Woodyard | Nov. 14, 1950 |
| 2,565,497 | Harling | Aug. 28, 1951 |
| 2,600,997 | Horovitz et al. | June 17, 1952 |
| 2,604,496 | Hunter | July 22, 1952 |
| 2,646,536 | Benzer et al. | July 21, 1953 |
| 2,647,995 | Dickinson | Aug. 4, 1953 |
| 2,655,608 | Valdes | Oct. 13, 1953 |
| 2,666,861 | Campbell | Jan. 19, 1954 |
| 2,833,969 | Christian | May 6, 1958 |